(12) United States Patent
Peterson et al.

(10) Patent No.: US 10,664,053 B2
(45) Date of Patent: May 26, 2020

(54) MULTI-TRANSDUCER TACTILE USER INTERFACE FOR ELECTRONIC DEVICES

(71) Applicant: Apple Inc., Cupertino, CA (US)

(72) Inventors: Carl R. Peterson, Cupertino, CA (US);
Derek W. Wright, Cupertino, CA (US);
Kevin D. Gibbs, Cupertino, CA (US);
Soyoung Kim, Cupertino, CA (US);
Stephen R. McClure, Belmont, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 15/273,668

(22) Filed: Sep. 22, 2016

(65) Prior Publication Data

US 2017/0090576 A1   Mar. 30, 2017

Related U.S. Application Data

(60) Provisional application No. 62/235,541, filed on Sep. 30, 2015, provisional application No. 62/325,970, filed on Apr. 21, 2016.

(51) Int. Cl.
| | |
|---|---|
| *G06F 3/01* | (2006.01) |
| *G06F 3/044* | (2006.01) |
| *G06F 1/16* | (2006.01) |

(52) U.S. Cl.
CPC .............. *G06F 3/016* (2013.01); *G06F 1/163* (2013.01); *G06F 3/044* (2013.01); *G06F 2203/04103* (2013.01)

(58) Field of Classification Search
CPC ........ G06F 1/163; G06F 1/1643; G06F 3/016; G06F 3/041; G06F 3/0412; G06F 3/0416;
(Continued)

(56) References Cited

U.S. PATENT DOCUMENTS 7,292,227 B2   11/2007   Fukumoto et al.
8,232,976 B2   7/2012    Yun et al.
(Continued)

FOREIGN PATENT DOCUMENTS

EP   2889727       7/2015
JP   2012511360    5/2012
(Continued)

OTHER PUBLICATIONS

International Search Report and Written Opinion dated Nov. 27, 2017, PCT/US2017/028182, 14 pages.

*Primary Examiner* — Keith L Crawley
(74) *Attorney, Agent, or Firm* — Brownstein Hyatt Farber Schreck, LLP

(57) ABSTRACT

Systems and methods for providing localized tactile output and systems and methods for obtaining localized physical characteristic information are disclosed. An electronic device can include a friction transducer configured to augment and/or detect friction between a surface of an electronic device and an object in contact with that electronic device. The electronic device may also include a force transducer configured to detect the force with which an object contacts a display. The force transducer may also provide mechanical output. The electronic device can also include a thermal transducer to augment and/or detect the temperature of various locations on a display.

21 Claims, 13 Drawing Sheets

(58) Field of Classification Search
CPC ........ G06F 3/043; G06F 3/0436; G06F 3/044;
G06F 3/046; G06F 2203/0381; G06F
2203/04103; G06F 2203/04106
See application file for complete search history.

(56) References Cited

U.S. PATENT DOCUMENTS

| | | | |
|---|---|---|---|
| 8,339,250 | B2 | 12/2012 | Je et al. |
| 8,405,618 | B2 | 3/2013 | Colgate et al. |
| 8,854,331 | B2 | 10/2014 | Heubel et al. |
| 9,330,544 | B2 | 5/2016 | Levesque et al. |
| 9,335,823 | B2 | 5/2016 | Modarres et al. |
| 9,367,150 | B2 | 6/2016 | Karkkainen |
| 9,547,430 | B2 | 1/2017 | Paek et al. |
| 9,639,158 | B2 | 5/2017 | Levesque et al. |
| 9,720,587 | B2 | 8/2017 | Matsuki |
| 2005/0057528 | A1 | 3/2005 | Kleen |
| 2011/0074733 | A1* | 3/2011 | Makinen ............... G09B 21/004 345/174 |
| 2011/0109588 | A1* | 5/2011 | Makinen ............... G09B 21/003 345/174 |
| 2011/0260996 | A1 | 10/2011 | Henricson |
| 2011/0316798 | A1 | 12/2011 | Jackson et al. |
| 2012/0062516 | A1* | 3/2012 | Chen ....................... G06F 3/016 345/174 |
| 2012/0268412 | A1* | 10/2012 | Cruz-Hernandez ......................... G06F 3/0488 345/174 |
| 2013/0057509 | A1* | 3/2013 | Cruz-Hernandez ..... G06F 3/044 345/174 |
| 2013/0113760 | A1 | 5/2013 | Gossweiler, III et al. |
| 2014/0118127 | A1* | 5/2014 | Levesque ................ G06F 3/016 340/407.2 |
| 2014/0192005 | A1* | 7/2014 | Wakuda .................. G06F 3/041 345/173 |
| 2014/0225848 | A1* | 8/2014 | Ogura .................... G06F 3/041 345/173 |
| 2014/0340316 | A1 | 11/2014 | Gu et al. |
| 2015/0185848 | A1 | 7/2015 | Levesque et al. |
| 2015/0205417 | A1 | 7/2015 | Yairi et al. |
| 2018/0039331 | A1 | 2/2018 | Warren |

FOREIGN PATENT DOCUMENTS

| | | |
|---|---|---|
| JP | 2013058154 | 3/2013 |
| JP | 2014528120 | 10/2014 |
| JP | 2015130168 | 7/2015 |

\* cited by examiner

MULTI-TRANSDUCER TACTILE USER INTERFACE FOR ELECTRONIC DEVICES

CROSS-REFERENCE TO RELATED APPLICATION

This application is a non-provisional patent application of, and claims the benefit to, U.S. Provisional Patent Application No. 62/235,541, filed Sep. 30, 2015, and titled "Multi-Sensory User Interface Devices," the disclosure of which is hereby incorporated herein by reference in its entirety.

FIELD

Embodiments described herein relate to user interfaces for electronic devices, and, more particularly, to input and output components that cooperate to provide a tactile user interface for an electronic device.

BACKGROUND

An electronic device can include a vibrating mechanism to communicate with a user by stimulating the user's sense of touch. The electronic device can activate the vibrating mechanism to solicit the user's attention, enhance the user's interaction experience with the electronic device, or for any other suitable notification or user experience purpose.

However, conventional electronic devices incorporating conventional vibrating mechanisms are only capable to provide output to a user in the form of vibrations; such devices are not capable to stimulate a user's sense of touch in any other manner.

SUMMARY

Embodiments described herein generally relate to an electronic device including a surface configured to receive a user touch. The surface can be an outer protective layer of the electronic device, such as a cover glass disposed over a display.

These embodiments include a friction transducer that is coupled to and/or in communication with the surface. The friction transducer can include an electrostatic plate and an ultrasonic transducer. The friction transducer may be configured to increase or decrease an amount of friction between the surface and an object in contact with, and moving across, the surface. These embodiments may also include a force transducer coupled to and/or in communication with the surface. The force transducer may be configured to locally deform the surface. In addition, these embodiments may also include a thermal transducer thermally coupled to and/or in communication with the surface. The thermal transducer may be configured to increase or decrease the temperature of the surface.

In some cases, an electronic device can include more than one electrostatic plate. For example, some embodiments may include an array of electrostatic plates. The electrostatic plates may be disposed on an exterior (or upper) surface of an outer protective layer of an electronic device. A dielectric layer may encapsulate the electrostatic plates. The electrostatic plates may be driven by capacitive coupling. In other cases, the electrostatic plates may be electrically connected to a drive circuit by a via extending through the outer protective layer or by a jumper extending around a periphery of the outer protective layer.

BRIEF DESCRIPTION OF THE FIGURES

Reference will now be made to representative embodiments illustrated in the accompanying figures. It should be understood that the following descriptions are not intended to limit the disclosure to a finite set of preferred embodiments. To the contrary, it is intended that the following description covers alternatives, modifications, and equivalents as may be included within the spirit and scope of the described or depicted embodiments and as defined by the appended claims.

The use of the same or similar reference numerals in different figures indicates similar, related, or identical items.

Figure 1A:
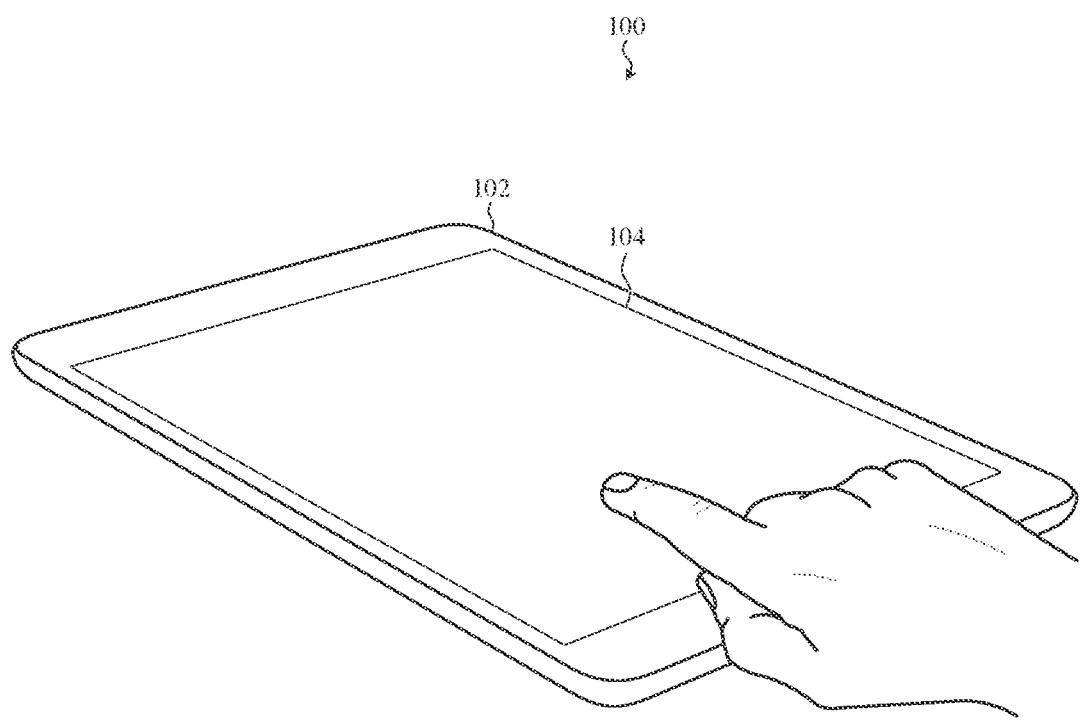
FIG. 1A depicts an electronic device with a tactile user interface associated with a touch-sensitive display.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference systems and methods for operating a tactile user interface. A tactile user interface such as described herein may be configured to provide output to a user (an "output mode") and/or may be configured to receive input from a user (an "input mode").

As described herein, a tactile user interface is typically operated relative to an external surface of an electronic device that may be touched by a user. For example, a tactile user interface may be operated relative to a touch-sensitive display of an electronic device. In another example, a tactile user interface may be operated relative to a back or side surface of an electronic device housing. In yet another example, a tactile user interface may be operated relative to an external surface of an input component in communication with an electronic device such as, but not limited to, a button, a sliding switch, a stylus, a knob, a crown, an inertial movement tracking device, and so on.

A tactile user interface such as described herein can be operated in one or more modes and either independently, or in conjunction with other input or output systems associated with the electronic device. For example, a tactile user interface can be operated in conjunction with a display, speaker, microphone, camera, touch-sensitive surface, a force-sensitive surface, or any other input or output system, whether peripheral to the electronic device or integrated within the electronic device. Example electronic devices that can incorporate or operate a tactile user interface include, but are not limited to, cellular phones, tablet computers, desktop computers, wearable electronic devices, peripheral input devices, console control systems, industrial control devices, medical devices, diagnostic devices, and so on.

Initially, embodiments related to an output mode of a tactile user interface are described. For example, an electronic device can operate a tactile user interface in an output mode to produce tactile output via a surface that may be touched by the user. When a user touches the surface and/or draws a finger across the surface, the user may perceive the surface to have characteristics or properties such as, but not limited to, warmness, coldness, smoothness, roughness, slipperiness, stickiness, wetness, dryness, and so on or any combination thereof. In addition, the user may perceive the surface to move, vibrate, shift, translate, depress, protrude, and so on or any combination thereof.

Accordingly, as used herein, the phrase "tactile output" broadly encompasses an output provided by one or more components of a tactile user interface that stimulates a user's sense of touch and/or a user's perception related to the user's sense of touch including, but not necessarily limited to, a sense of surface temperature, a sense of surface topology, a sense of surface friction, a sense of numbness, a sense of mechanical pressure, a sense of mechanical distortion, a sense of motion, a sense of vibration, a sense of stickiness, a sense of slipperiness, a sense of attraction, and so on or any combination thereof.

Similarly, the phrase "tactile user interface" as used herein broadly encompasses the components, or groups of components, that may be used by an electronic device operating in an output mode to stimulate a user's sense of touch and/or affect a user's perception related to the user's sense of touch.

In some cases, an electronic device operates a tactile user interface in an output mode to provide tactile output independent of other input or output systems associated with the electronic device. In other cases, the electronic device operates a tactile user interface in an output mode to provide a tactile output in conjunction with another output provided by the electronic device. This may have the effect of enhancing the user experience of operating the electronic device by stimulating more than one of the user's senses simultaneously or in a sequence or pattern.

For example, an electronic device can provide tactile output in conjunction with one or more elements shown on a display. Various elements shown on the display, boundaries between elements, areas of the display not showing elements, and so on, can each be associated with specific and/or different tactile outputs or combinations of tactile outputs.

For example, a low-friction tactile output and a low-temperature tactile output may be provided when an image of ice is shown on the display of the electronic device. The user perceives a slippery and cold surface when the user touches the ice image. In another example, a high-friction tactile output and a high-temperature tactile output may be provided when an image of beach sand is shown on the display. The user perceives a rough and hot surface when the user touches the beach sand image.

In other examples, the electronic device can provide a tactile output to virtual input regions shown on the display, such as a button, a key, a dial, and so on. In these examples, the electronic device can provide a first tactile output to an area of the surface within the virtual input region and a second tactile output to an area of the surface adjacent to the virtual input region (e.g., border or perimeter around the virtual input region). The different tactile outputs may define a boundary or perimeter of the virtual input region that can be felt by a user. In other cases, the electronic device can provide a tactile output so that the user can perceive a key or a symbol on the virtual input region (e.g., embossment).

In further embodiments, the electronic device provides additional output. For example, the electronic device can modify or animate an image shown on the display in response to a user touch. In another example, the electronic device can generate a sound in response to a user touch; a high-friction tactile output may be associated with a scraping sound and a low-friction tactile output may be associated with a sliding sound.

Next, embodiments related to an input mode of a tactile user interface are described. In these embodiments, the electronic device operates the tactile user interface in an input mode to receive input from a user via a surface that may be touched by the user. When the user touches the surface, or places an object in contact with the surface, the electronic device collects information related to surface, material, or environmental characteristics of the object such as, but not limited to, warmness, coldness, smoothness, roughness, slipperiness, stickiness, and so on.

As used herein, the phrase "physical characteristic information" generally encompasses data, measurements, determinations, and/or estimations of one or more physical properties of an object (e.g., a user's finger or hand, a stylus, and so on) in contact with a surface associated with a tactile user interface. These physical properties can include, but are not limited to, temperature, color, surface texture, weight, magnitude of force exerted by the object to the surface, movement of the object, friction between the object and the surface, and so on. In many embodiments described herein, physical characteristic information is obtained by the tactile user interface when operated in an input mode.

These and other embodiments are discussed below with reference to FIGS. 1A-10. However, those skilled in the art will readily appreciate that the detailed description given herein with respect to these figures is for explanatory purposes only and should not be construed as limiting.

Figure 1B:
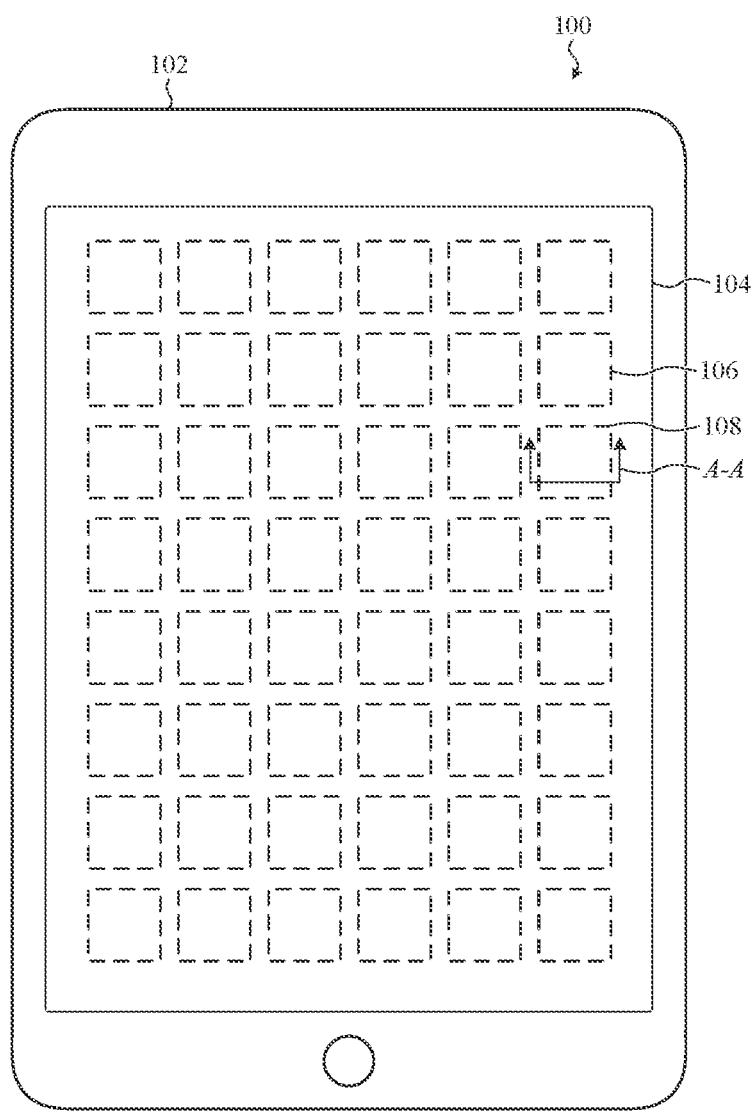
FIG. 1B depicts a plan view of the electronic device of FIG. 1A, depicting addressable segments of the tactile user interface in phantom.

Generally and broadly, FIGS. 1A-1B depict an electronic device that incorporates a tactile user interface. The tactile user interface can be operated in an input mode, an output mode, or a combined mode. In the combined mode, the tactile user interface operates in both an input mode and an output mode simultaneously, or rapidly switches between an input mode and an output mode (e.g., time multiplexing). In the illustrated embodiment, the electronic device is depicted as a tablet computer, although this may not be required of all embodiments and the electronic device can take other forms.

In the illustrated embodiment, the tactile user interface may be disposed relative to a touch-sensitive display of the electronic device. In this configuration, the electronic device may provide tactile output to a user when the user touches the display when the tactile user interface is operating in an output mode. The tactile output may be localized to a particular region of the touch-sensitive display, or may be provided across the entire touch-sensitive display.

In some cases, more than one tactile output may be provided at the same time. If a user touches a first location of the touch-sensitive display, the user may perceive a first tactile output. If the user touches a second location of the touch-sensitive display, the user may perceive a second tactile output. If the user drags a finger from the first location to the second location, the user may perceive a transition, which may be abrupt or gradual, between the first tactile output and the second tactile output. In further embodiments, the boundary or border may be associated with yet a third tactile output.

In further embodiments, the electronic device can also collect physical characteristic information from an object that touches the display when the tactile user interface is operating in an input mode. The object, such as a user's finger, can contact the touch-sensitive display and various properties of the object can be determined and communicated to the electronic device. Thereafter, the electronic device can use the various properties of the object to perform, schedule, coordinate, change, or terminate one or more processes, functions, or operations of the electronic device or another device in communication with the electronic device. More generally, the electronic device can use the various properties of the object for any suitable purpose.

It is with reference to the foregoing embodiments that FIGS. 1A-1B are provided. In particular, FIG. 1A depicts the electronic device 100 including at least a housing 102 and a display 104. The display 104 may be associated with a tactile user interface. The tactile user interface may be positioned above, integrated with, positioned below, or positioned along the periphery of the display 104.

The housing 102 can form an outer surface or partial outer surface and protective case for the internal components of the electronic device 100, including the tactile user interface.

In the illustrated embodiment, the housing 102 is formed in a substantially rectangular shape, although this is not required. The housing 102 can be formed of one or more components operably connected together, such as a front piece and a back piece or a top clamshell and a bottom clamshell. Alternatively, the housing 102 can be formed of a single piece (e.g., uniform body). The housing 102 may be planar, or may be partially or entirely curved. In many embodiments the housing 102 is rigid, although this may not be required; in one embodiment the housing 102 is configured to bend or flex in an elastic manner.

The display 104 may be integrated with one or more touch sensors and/or force sensors that are configured to detect various combinations of user touch and force input on the surface of the display 104, generally referred to herein as the "surface" that may be touched by a user. The touch and/or force sensors associated with the display 104 may provide a touch-sensitive surface that is configured to detect the location of a touch, a magnitude and/or direction of force exerted, and/or a movement of the touch on the display 104.

The touch and/or force sensors associated with the display 104 may be used separately or in combination to interpret a broad range of user inputs such as, but not limited to, touch-based gestures, force-based gestures, touch patterns, tap pattern, single-finger gestures, multi-finger gestures, multi-force gestures, and so on.

The touch and/or force sensors associated with the display 104 may be implemented in any number of suitable ways with any suitable technology or combination of technologies including, but not limited to, self-capacitance touch sensing, mutual capacitance touch sensing, resistive touch sensing, optical touch sensing, acoustic touch sensing, capacitive force sensing, strain-based force sensing, optical force sensing, acoustic force sensing, and so on, or any combination thereof. The touch and/or force sensors may be independently or mutually addressable and may be distributed and/or segmented across the display 104. In other embodiments, the touch and/or force sensors may be disposed relative to a perimeter of the display 104. In such embodiments, the touch and/or force sensors may be disposed below an opaque or translucent bezel surrounding the display 104.

The display 104 can be implemented with any suitable technology, including, but not limited to, a multi-touch or multi-force sensing touchscreen that uses liquid crystal display technology, light-emitting diode technology, organic light-emitting display technology, organic electroluminescence technology, or another type of display technology.

The manner by which the tactile user interface operates with the display 104 may depend, to a certain extent, on the technology selected to implement the display 104 or the touch and/or force sensors integrated with the display 104. For example, a tactile user interface may be disposed below a display 104 that is implemented with organic light emitting diodes. In another example, a tactile user interface may be disposed above a backlight of a display 104 that is implemented with liquid crystal technology. These examples are merely illustrations of possible configurations of a display and a tactile user interface; a tactile user interface such as described herein may be implemented and/or integrated with a chosen display technology in any suitable manner.

One such example configuration is illustrated in FIG. 1B, which depicts a plan view of the electronic device 100 shown in FIG. 1A. In this embodiment, the tactile user interface is disposed below an outer protective layer positioned above the display 104 and drawn in phantom. The outer protective layer encloses the display 104 within the housing 102 and provides a surface for a user to touch the display 104.

In this embodiment, the tactile user interface is segmented. In particular, forty eight individually-addressable segments of the tactile user interface are shown. Two of these elements are labeled; the individually-addressable segment 106 is positioned relative to the right periphery of the display 104 and the individually-addressable segment 108 is below the individually-addressable segment 106, along the same periphery.

As noted above, the independently-addressable segments of the tactile user interface can be incorporated into an outer protective layer (e.g., cover glass, sapphire, and so on) that protects and encloses other elements of the display 104. In other cases, the independently-addressable segments of the tactile user interface may be incorporated into different layers within a display stack (e.g., a stack of layers that collectively form the display 104).

The independently-addressable segments of the tactile user interface may each include one or more transducers such as, but not limited to, a thermal transducer, a force transducer, and a friction transducer. In an output mode, a processor (not shown) associated with the tactile user interface can apply an electrical signal to one or more of the transducers in order to provide a tactile output localized to a particular location of the display 104. Similarly, in an input mode, the processor can be configured to obtain one or more electrical signals from one or more of the transducers in order to determine localized physical characteristic information about an object in contact with the surface.

In one embodiment, the individually-addressable segment 106 includes a thermal transducer configured, in an output mode, to increase or decrease the temperature of the outer protective layer of the electronic device 100. The thermal transducer can be implemented as a Peltier element, a resistive element, or any other suitable element configured to change temperature in response to an electronic signal. In some cases, the thermal transducer may simulate a temperature without physically changing temperature, for example by implementing the thermal grill illusion.

In an input mode, the thermal transducer can output an electrical signal corresponding to its temperature which be received by the processor associated with the tactile user interface.

In another embodiment, the individually-addressable segment 106 includes a force transducer configured, in an output mode, to exert a positive or negative magnitude force to the outer protective layer of the electronic device 100. The positive or negative magnitude force may be perceived by a user of the electronic device as a deformation of the outer protective layer, a vibration of the outer protective layer, a shifting of the outer protective layer, a clicking of the outer protecting layer, and so on.

The force transducer can be a piezoelectric element, an ultrasonic transducer, an electrically deformable material (e.g., nitinol), an electromagnet and attractor plate, or any other suitable element. In other cases, the force transducer may be an eccentrically weighted motor, linear actuator, or any other suitable mechanical element. For example, the force transducer may be configured to distort one portion of the outer protective surface outwardly and another portion of the outer protective layer inwardly. In this example, a user may perceive different areas of the outer protective layer to exhibit a texture or surface topology.

In an input mode, the force transducer can output an electrical signal corresponding to a deformation of the outer protective layer which be received by the processor associated with the tactile user interface.

In another embodiment, the individually-addressable segment 106 includes a friction transducer configured, in an output mode, to electrostatically attract or acoustically repel an object in proximity to the outer protective layer of the electronic device 100. The attraction or repulsion may be perceived by a user of the electronic device as high friction or low friction, respectively. The friction transducer can include an electrostatic plate and an acoustic element, such as an ultrasonic transducer. The electrostatic plate may be supplied with a high voltage (e.g., greater than 75 volts) that causes the electrostatic plate to electrostatically attracts an object in proximity of the outer protective layer.

The acoustic element may be supplied with an alternating current that causes the acoustic element to generate a pressure wave that repels an object in proximity of the outer protective layer. In other embodiments, the acoustic element and the electrostatic plate may be used together. For example, the acoustic element may be configured to vibrate the entire outer protective layer to provide a global reduction in friction while a set of electrostatic plates may be configured to provide local increase in friction. In this example, a user may perceive different areas of the outer protective layer to exhibit different amounts of friction.

In an input mode, the friction transducer can output an electrical signal from the electrostatic plate corresponding to a capacitance between the object in proximity of the outer protective layer, which in turn can be related to the friction between the object and the outer protective layer. This capacitance can be received by the processor associated with the tactile user interface.

The foregoing description of the embodiment depicted in FIGS. 1A-1B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of a tactile user interface are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the various components of the individually-addressable segments of the tactile user interface depicted in FIGS. 1A-1B can be implemented in a number of suitable and implementation-specific ways.

Figure 2:
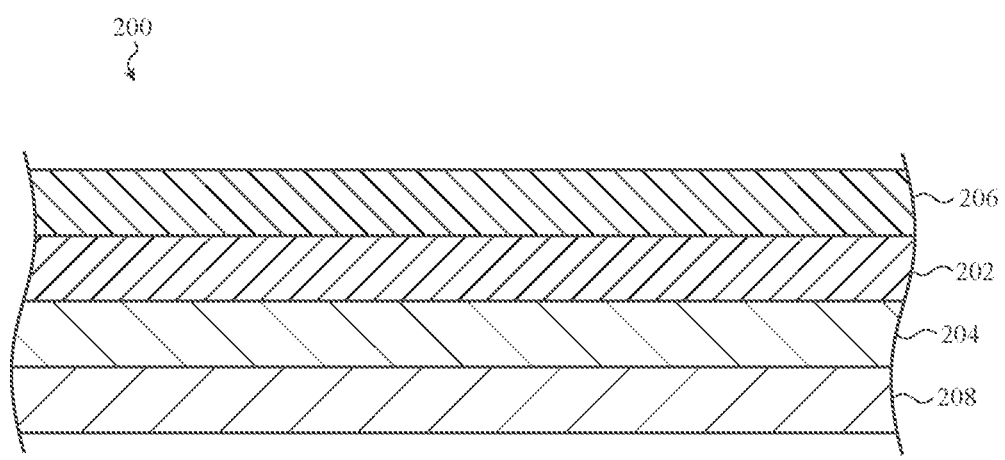
FIG. 2 depicts a simplified cross-section of one addressable segment of the tactile user interface of FIG. 1B, taken through section A-A.
Figure 3A:
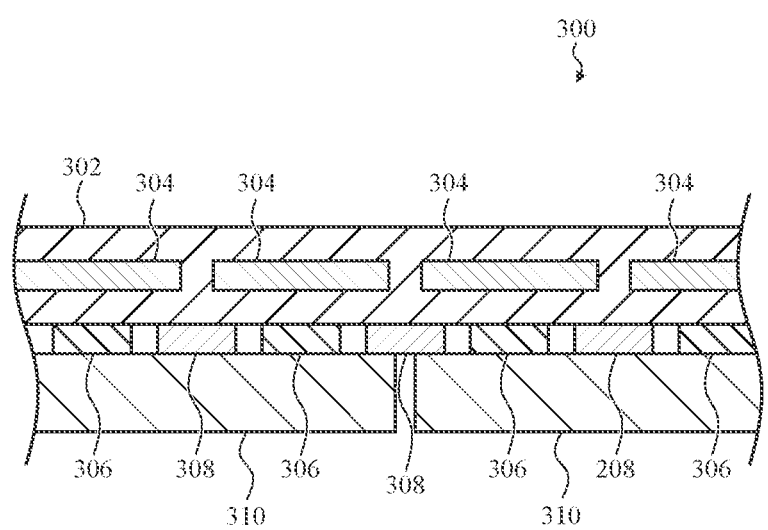
FIG. 3A depicts a cross-section of an addressable segment of a tactile user interface such as described herein, particularly illustrating a group of transducers disposed relative to a surface that may be touched by a user.
Figure 3B:
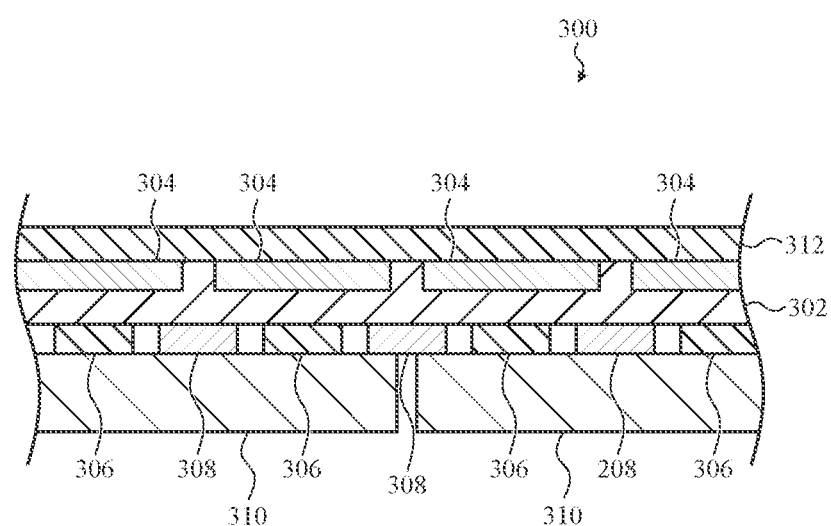
FIG. 3B depicts a cross-section of another addressable segment of a tactile user interface such as described herein, particularly illustrating a group of transducers disposed below a dielectric coating that defines a surface that may be touched by a user.

Generally and broadly, FIGS. 2-3B depict an cross-sections of one or more individually-addressable segments of a tactile user interface such as described herein. The individually-addressable segments can be operated in an input mode, an output mode, or a combined mode. In the combined mode, the individually-addressable segments operates in both an input mode and an output mode simultaneously, or rapidly switches between an input mode and an output mode (e.g., time multiplexing).

In particular, FIG. 2 depicts a simplified cross-section of an addressable segment 200 of the tactile user interface of FIG. 1B, taken through section A-A. In this example, the addressable segment 200 of the tactile user interface includes an electrostatic plate 202 that may be associated with a friction transducer such as described herein.

The electrostatic plate 202 is be disposed above to an outer protective layer 204. The electrostatic plate 202 may be disposed above the outer protective layer 204 in order to reduce the distance between the electrostatic plate 202 and an object that may be attracted to the electrostatic plate 202 when a voltage is applied to the electrostatic plate 202. However, in other embodiments the electrostatic plate 202 may be disposed below the protective layer 204.

The electrostatic plate 202 is coated with a dielectric protective layer 206. The dielectric protective layer 206 provides a physical and electrical separation between the electrostatic plate 202 and a user (not shown). In many embodiments, the dielectric protective layer 206 is transparent, although this may not be required.

The dielectric protective layer 206 may be formed from any number of suitable dielectric materials and may be disposed to any suitable thickness. In many examples, the thickness of the dielectric protective layer 206 is substantially less than the thickness of the outer protective layer 204. Materials that may be used to form the dielectric protective layer 206 may include, without limitation, aluminum oxide, titanium dioxide, niobium pentoxide, or any other suitable material.

The dielectric protective layer 206 may be deposited onto the electrostatic plate 202 in any suitable manner. For example, the dielectric protective layer 206 may be formed by sputtering, physical vapor deposition, thermal evaporation, or any other suitable technique.

In this configuration, the electrostatic plate 202 may be electrically isolated from both the user and from additional components within the electronic device, such as a display 208. In other words, the outer protective layer 204 serves as an electrical isolation.

The electrostatic plate 202 can be made from any number of suitable materials. In many embodiments, the electrostatic plate 202 may be formed from an optically clear material, but this may not be required. For example the electrostatic plate 202 may be formed from metal oxides such as, but not limited to, indium-tin oxide, zinc oxide, antimony tin oxide, and so on. In many examples, the material used to form the electrostatic plate 202 is selected for its sheet resistance. Higher sheet resistance may yield greater electrostatic attraction effects.

The electrostatic plate 202 may be deposited onto the outer protective layer 204 in any suitable manner. For example, the electrostatic plate 202 may be formed by sputtering, physical vapor deposition, thermal evaporation, or any other suitable technique.

FIG. 3A depicts a cross-section of an addressable segment of a tactile user interface such as described herein, particularly illustrating a group of transducers disposed relative to a surface that may be touched by a user. In this illustrated embodiment, the tactile user interface cross-section 300 includes several individually-addressable electrostatic elements 304, several individually-addressable piezoelectric elements 306, several individually-addressable thermal elements 308, and several individually-addressable high-magnitude force output elements 310.

In some cases, the several individually-addressable electrostatic elements 304 may be formed from an optically clear material such as, but not limited to, metal oxides and metal nanowires. In some cases, such as shown, the several individually-addressable electrostatic elements 304 may be embedded within the surface 302, although this is not required. The surface 302 may be an outer protective layer of an electronic device such as the electronic device 100 depicted in FIGS. 1A-1B.

Although not shown, the several individually-addressable electrostatic elements 304 may be coupled to one or more circuits within the electronic device via one or more electrical traces which may be optically clear. As noted above, the several individually-addressable electrostatic elements 304 may be associated with a friction transducer of the tactile user interface. When an electrical signal is applied to one or more of the several individually-addressable electrostatic elements 304, the elements may generate an electric field that repels charges of like polarity nearby and attract charges of opposite polarity nearby. Thus, as a result of the electric field, a user's finger may be attracted to the surface 302. Due to the attraction, the user may perceive that friction between the finger and the surface 302 has increased.

The several individually-addressable piezoelectric elements 306 may be formed from an optically clear material such as, but not limited to, metal oxides. In some cases, such as shown, the several individually-addressable piezoelectric elements 306 may be positioned on a bottom surface of the surface 302, although this is not required. Although not shown, the several individually-addressable piezoelectric elements 306 may be coupled to one or more circuits within the electronic device via one or more electrical traces which may be optically clear. As noted above, the several individually-addressable piezoelectric elements 306 may be associated with a friction transducer of the tactile user interface. In other cases, the several individually-addressable piezoelectric elements 306 may also be associated with a force transducer of a tactile user interface.

When a rapidly-varying electrical signal is applied to one or more of the several individually-addressable piezoelectric elements 306, the elements may cause the surface 302 rapidly move upwardly and downwardly. Thus, as a result of the rapid motion of the surface 302, the user may perceive that friction between the finger and the surface has decreased.

As with other components of the tactile user interface, the several individually-addressable thermal elements 308 may be formed from an optically clear material such as, but not limited to, metal oxides or silver nanowires. In some cases, the several individually-addressable thermal elements 308 may be formed into Peltier elements. In some cases, such as shown, the several individually-addressable thermal elements 308 may be positioned on a bottom surface of the surface 302, although this is not required. Although not shown, the several individually-addressable thermal elements 308 may be coupled to one or more circuits within the electronic device via one or more electrical traces which may be optically clear.

When an electrical signal is applied to one or more of the several individually-addressable thermal elements 308, the elements may cause the surface 302 increase or decrease in temperature which in turn may cause the surface 302 to change temperature. Thus, the user may perceive that one portion of the surface 302 has a different temperature than another portion of the surface 302.

The high-magnitude force output elements 310 may be implemented in many different ways. For example, in some embodiments, the high-magnitude force output elements 310 may be implemented as, without limitation: a linear actuator, an eccentrically-weighted motor, a solenoid, an impacting solenoid, shape memory wire, and so on. As noted above, the high-magnitude force output elements 310 may be associated with a thermal transducer of a tactile user interface. In some examples, the high-magnitude force output elements 310 may be used to adjust the local height of the surface; activation of the high-magnitude force output elements 310 may cause the surface to bend or locally deform, locally increasing the height thereof. Similarly, the high-magnitude force output elements 310 may be used to decrease the local height of an area of a surface.

In other embodiments, a dielectric coating 312 may be disposed over the surface 302, such as shown in FIG. 3B. As noted with respect to other embodiments described herein, the dielectric coating 312 may ensure electrical separation between various portions of the tactile user interface from the user.

As with other embodiments, the foregoing description related to the embodiments depicted in FIGS. 2-3B, and various alternatives thereof and variations thereto are merely presented for purposes of explanation. It will be apparent to one skilled in the art that some of the specific details presented herein may not be required in order to practice a particular described embodiment, or an equivalent thereof. Thus, it is understood that the foregoing and following descriptions of specific embodiments are presented for the limited purposes of illustration and description. These descriptions are not targeted to be exhaustive or to limit the disclosure to the precise forms recited above. To the contrary, it will be apparent to one of ordinary skill in the art that many modifications and variations are possible in view of the above teachings.

Generally and broadly, FIGS. 4-6B depict a cross-section of an electronic device that integrates an electrostatic plate of a friction transducer of tactile user interface into a protective outer layer of the electronic device. As with other embodiments described herein, the electrostatic plate can be operated in an input mode, an output mode, or a combined mode. In the combined mode, the tactile user interface operates in both an input mode and an output mode simultaneously, or rapidly switches between an input mode and an output mode (e.g., time multiplexing). The illustrated embodiment may be use with any suitable tactile user interface, such as the tactile user interface depicted in FIG. 1B.

An electrostatic plate such as depicted in FIGS. 4-6B can be formed form any number of suitable materials. In many embodiments, the electrostatic plate is formed from a material having a high sheet resistance, although this may not be required. As with other embodiments described herein, the electrostatic plate may be disposed directly into an outer surface of an outer protective layer associated with the electronic device. The electrostatic plate may attached, deposited, disposed, affixed, or adhered to the outer surface using any suitable technique. Such techniques include, but are not limited to, sputtering, lamination, physical vapor deposition, thermal deposition, and so on.

In many of these embodiments, a dielectric coating is disposed over the electrostatic plate. The dielectric coating can be formed to any suitable thickness and may be made with any number of suitable materials.

The electrostatic plate may be coupled to a driving circuit. The driving circuit may be configured to convey an electrical signal to the electrostatic plate. The driving circuit, in many embodiments, is disposed below the outer protective layer. Accordingly, an electrical connection between the electrostatic plate and the driving circuit must be made. In some embodiments, the electrical connection may be a via formed through the outer protective layer. In another embodiment, the electrical connection may be a jumper that extends around a periphery of the outer protective layer. In still further embodiments, the electrical connection may not be required—the electrostatic plate may be driven by capacitive coupling. In some examples, the electrostatic plate may be driven by direct capacitive coupling (e.g., modeled by a single capacitor between a drive plate and a the electrostatic plate) whereas in others, the electrostatic plate may be driven by indirect capacitive coupling (e.g., modeled as two or more series capacitors between a drive plate and the electrostatic plate).

In many cases, a single electrostatic plate may be formed onto the outer surface of the outer protective layer whereas in others, the electrostatic plate may be segmented with each segment being individually addressable. In these embodiments, conductive traces may also be formed into the outer protective layer. The conductive traces may serve to electrically couple the individually-addressable segments of the electrostatic plate to a drive circuit. In these examples, the conductive traces may be formed so as to exhibit a lower resistance than the electrostatic plate. More specifically, the conductive traces may be formed of the same material as the electrostatic plate, but may be formed to a greater thickness than the electrostatic plate. In another example, the conductive traces may be formed of a different material; the conductive traces may be formed with a material that exhibits a lower sheet resistance than the electrostatic plate.

It is with respect to these and other embodiments that FIGS. 4-6B are provided. However, it may be appreciated that these described and depicted embodiments are merely examples of possible configurations of an electrostatic plate such as described herein and are not targeted to be exhaustive or to limit the disclosure to the precise forms recited herein.

Figure 4:
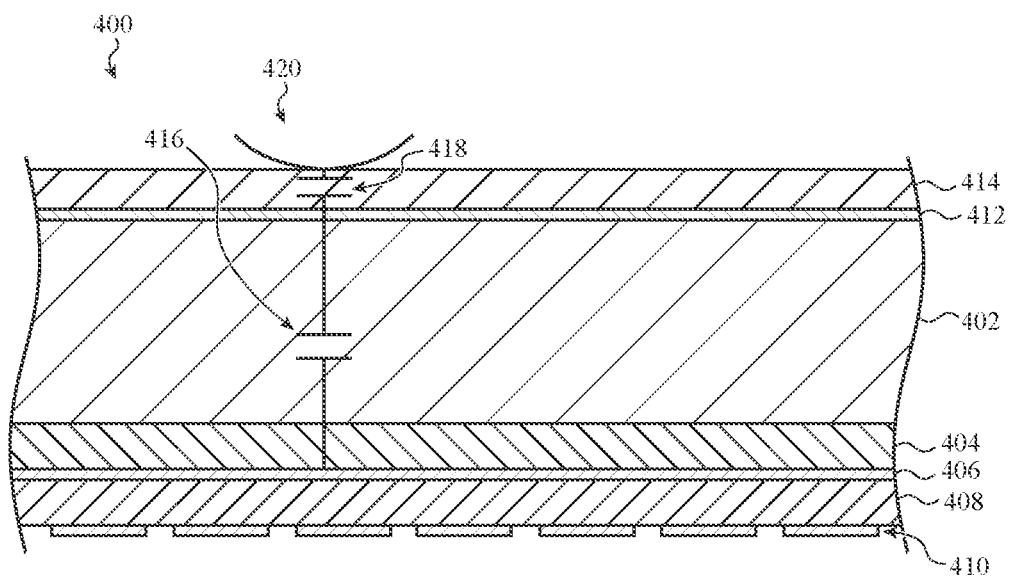
FIG. 4 depicts a cross-section of an electrostatic plate that may be used with a tactile user interface such as described herein.

FIG. 4 depicts a cross-section of an electrostatic plate that may be used with a tactile user interface 400 such as described herein. The tactile user interface 400 may be associated with an outer protective layer 402 of an electronic device. The outer protective layer 402 may be a cover glass disposed over a touch-sensitive element. The touch-sensitive element may be adhered to an underside of the outer protective layer 402 by an adhesive 404. The touch-sensitive element can include two sets of electrodes separated by a dielectric material. In the illustrated embodiment, a top electrode set 406 (only one of the set is visible) is disposed on a top surface of a dielectric 408. A bottom electrode set 410 (seven electrodes of the set are visible) is disposed on a bottom surface of the dielectric 408. Changes in capacitance between the top electrode set 406 and the bottom electrode set 410 can be used to determine the location of an object (e.g., a user's finger) in proximity of or in contact with the outer protective layer 402.

In this embodiment an electrostatic plate 412 is disposed on an upper surface of the outer protective layer 402. A dielectric coating 414 is disposed over the electrostatic plate 412.

As noted with respect to other embodiments described herein, the electrostatic plate 412 may attract an object in proximity of the tactile user interface 400 when a drive voltage is applied to the electrostatic plate 412. The drive voltage may be applied to the electrostatic plate 412 in any number of suitable ways. For example, an electrical trace (not shown) can be coupled to the electrostatic plate 412 and the drive voltage may then be applied to the electrical trace.

In other embodiments, the drive voltage may be applied to the electrostatic plate 412 via capacitive coupling. For example, a first voltage may be applied to the top electrode set 406. As a result of the proximity of the electrostatic plate 412 and the top electrode set 406, a capacitance 416 may develop between the electrostatic plate 412 and the top electrode set 406. The capacitance 416 may develop whether or not the electrostatic plate 412 shares a common ground with the top electrode set 406.

Once the electrostatic plate 412 is at the drive voltage, a second capacitance 418 develops between a the electrostatic plate 412 and an object 420 in proximity of the tactile user interface 400. If the drive voltage is sufficiently high, the object 420 may be attracted to the electrostatic plate 412.

Figure 5:
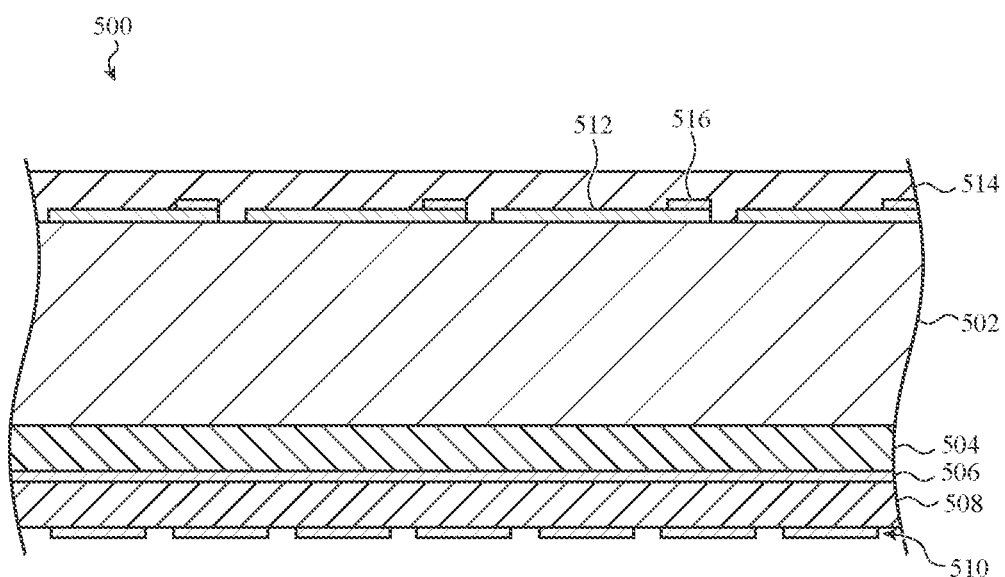
FIG. 5 depicts a cross-section of an addressable and segmented electrostatic plate that may be used with a tactile user interface such as described herein.

FIG. 5 depicts a cross-section of an addressable and segmented electrostatic plate that may be used with a tactile user interface 500 such as described herein. As with the embodiment depicted in FIG. 4, the tactile user interface 500 may be associated with an outer protective layer 502 of an electronic device. The outer protective layer 502 may be a cover glass disposed over a touch-sensitive element. The touch-sensitive element may be adhered to an underside of the outer protective layer 502 by an adhesive 504. The touch-sensitive element can include two sets of electrodes separated by a dielectric material. In the illustrated embodiment, a top electrode set 506 (only one of the set is visible) is disposed on a top surface of a dielectric 508. A bottom electrode set 510 (seven electrodes of the set are visible) is disposed on a bottom surface of the dielectric 508. Changes in capacitance between the top electrode set 506 and the bottom electrode set 510 can be used to determine the location of an object (e.g., a user's finger) in proximity of or in contact with the outer protective layer 502.

In this embodiment a segmented electrostatic plate may be disposed on an upper surface of the outer protective layer 502. In FIG. 5, four individually-addressable and segmented electrostatic plates are shown. Each of the individually-addressable and segmented electrostatic plates may be formed in the same manner, although this is not required. A single individually-addressable and segmented electrostatic plate 512 is identified. A dielectric coating 514 is disposed over the individually-addressable and segmented electrostatic plates, including the individually-addressable and segmented electrostatic plate 512.

As noted with respect to other embodiments described herein, the individually-addressable and segmented electrostatic plate 512 may attract an object in proximity of the tactile user interface 500 when a drive voltage is applied to the individually-addressable and segmented electrostatic plate 512. The drive voltage may be applied to the individually-addressable and segmented electrostatic plate 512 in any number of suitable ways. For example, an electrical trace 516 can be coupled to the individually-addressable and segmented electrostatic plate 512 and the drive voltage may then be applied to the electrical trace 516.

In many cases, the individually-addressable and segmented electrostatic plate 512 may be formed from a material having a high sheet resistance. The electrical trace 516 may be formed from a material having a low sheet resistance. In this manner, electrical losses within the electrical trace 516 may be minimized.

As shown, the electrical trace 516 may be formed on an upper surface of the individually-addressable and segmented electrostatic plate 512. This is merely one possible configuration and other configurations are possible such as, but not limited to, the electrical trace 516 positioned adjacent to the individually-addressable and segmented electrostatic plate 512, the electrical trace 516 positioned below to the individually-addressable and segmented electrostatic plate 512, the electrical trace 516 positioned within the individually-addressable and segmented electrostatic plate 512, the electrical trace 516 positioned around a periphery of the individually-addressable and segmented electrostatic plate 512, and so on.

Figure 6A:
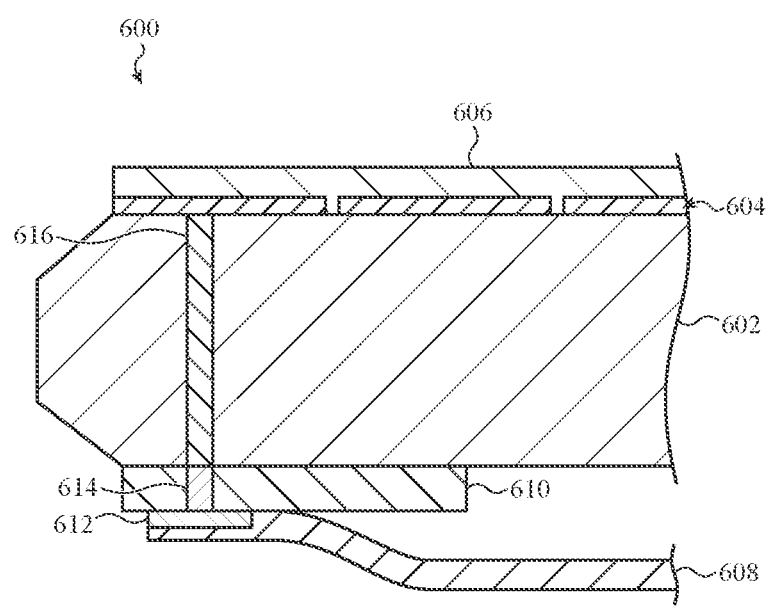
FIG. 6A depicts a cross-section of a through-glass via that extends through a surface of an electronic device, the through-glass via coupling an addressable and segmented electrostatic plate disposed relative to one side of the surface to a circuit disposed relative to another side of the surface.

FIG. 6A depicts a cross-section of a through-glass via that extends through a surface of an electronic device, the through-glass via coupling an addressable and segmented electrostatic plate disposed relative to one side of the surface to a circuit disposed relative to another side of the surface.

In particular, the tactile user interface 600 is, like other embodiments described herein, associated with an outer protective layer 602. The outer protective layer 602 may be formed from any number of suitable materials such as, but not limited to, glass, sapphire, plastic, ceramic, metal (with a dielectric outer coating, such an anodization layer) and so on. The outer protective layer 602 may be transparent or opaque. The outer protective layer 602 may be a single layer of material or may be formed from multiple layers of material.

An electrostatic plate 604 can be associated with an upper surface of the outer protective layer 602. The electrostatic plate 604 may be segmented, each segment being individually addressable. As with other embodiments described herein, the electrostatic plate 604 can be formed using any suitable process from any suitable material or combination of materials.

A dielectric coating 606 is disposed above the electrostatic plate 604, thereby encapsulating the electrostatic plate 604. As with other embodiments described herein, the dielectric coating 606 can be formed using any suitable process from any suitable material or combination of materials.

A drive circuit 608 may be disposed below the outer protective layer 602. In some embodiments, the drive circuit 608 can be disposed at least partially below a cosmetic ink layer 610. The drive circuit 608 may include one or more processors, electrical circuit elements, flexible circuit boards, circuit connectors, and so on.

The cosmetic ink layer 610 can be disposed along a periphery of a lower surface of the outer protective layer 602. In some examples, the outer protective layer 602 is positioned above a display. In this example, the cosmetic ink layer 610 may define a bezel of the display. The cosmetic ink layer 610 may be formed from any number of suitable materials and may be deposited onto the lower surface in any suitable manner. The cosmetic ink layer 610 is typically opaque, but this may not be required of all embodiments.

The drive circuit 608 can be electrically coupled to an electrical contact 612 of the electrostatic plate 604. In the illustrated embodiment, the electrical contact 612 is in electrical contact with a first via 614. The first via 614 is defined through the cosmetic ink layer 610. The first via 614 can be formed from any number of suitable electrically conductive materials.

In one embodiment, the first via 614 is formed after the cosmetic ink layer 610 is formed on the outer protective layer 602. In this example, the first via 614 is formed using an etch-and-fill process. In other examples, the first via 614 may be formed in another manner.

The first via 614 may be electrically coupled to a second via 616 that is electrically connected to the electrostatic plate 604. In this manner, the drive circuit 608 is electrically connected to the electrostatic plate 604.

The second via 616 is defined through the outer protective layer 602. The second via 616 can be formed from any number of suitable electrically conductive materials. In one embodiment, the second via 616 is formed after drilling or etching through outer protective layer 602 using a technique suitable for the material(s) used to form the outer protective layer 602.

Figure 6B:
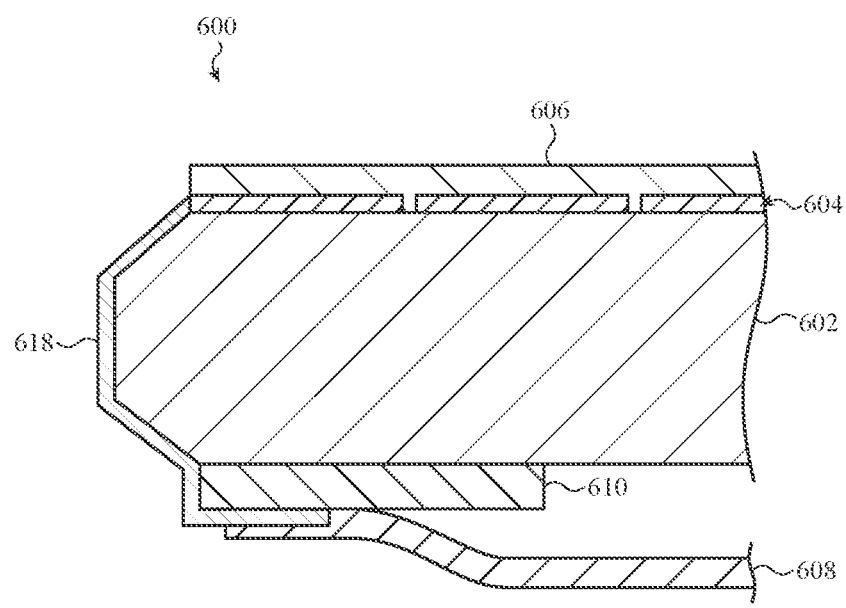
FIG. 6B depicts a cross-section of periphery jumper that extends around an edge of a surface of an electronic device, the jumper coupling an addressable and segmented electrostatic plate disposed relative to one side of the surface to an electrical circuit disposed relative to another side of the surface.

FIG. 6B depicts a cross-section of periphery jumper that extends around an edge of a surface of an electronic device, the jumper coupling an addressable and segmented electrostatic plate disposed relative to one side of the surface to an electrical circuit disposed relative to another side of the surface.

In particular, the tactile user interface 600 is, like other embodiments described herein, associated with an outer protective layer 602. The outer protective layer 602 may be formed from any number of suitable materials such as, but not limited to, glass, sapphire, plastic, ceramic, metal (with a dielectric outer coating, such an anodization layer) and so on. The outer protective layer 602 may be transparent or opaque. The outer protective layer 602 may be a single layer of material or may be formed from multiple layers of material.

As with the embodiment depicted in FIG. 6A, an electrostatic plate 604 can be associated with an upper surface of the outer protective layer 602. The electrostatic plate 604 may be segmented, each segment being individually addressable. As with other embodiments described herein, the electrostatic plate 604 can be formed using any suitable process from any suitable material or combination of materials.

A dielectric coating 606 is disposed above the electrostatic plate 604, thereby encapsulating the electrostatic plate 604. As with other embodiments described herein, the dielectric coating 606 can be formed using any suitable process from any suitable material or combination of materials.

A drive circuit 608 may be disposed below the outer protective layer 602. In some embodiments, the drive circuit 608 can be disposed at least partially below a cosmetic ink layer 610. The drive circuit 608 may include one or more processors, electrical circuit elements, flexible circuit boards, circuit connectors, and so on.

As noted with respect to FIG. 6A, the cosmetic ink layer 610 can be disposed along a periphery of a lower surface of the outer protective layer 602. The cosmetic ink layer 610 may be formed from any number of suitable materials and may be deposited onto the lower surface in any suitable manner. The cosmetic ink layer 610 is typically opaque, but this may not be required of all embodiments.

The drive circuit 608 can be electrically coupled to the electrostatic plate 604 via a periphery jumper 618. The periphery jumper 618 may extend around an edge of the outer protective layer 602. The periphery jumper 618 may be formed from any number of suitable electrically conductive materials or combination of materials.

As with other embodiments, the foregoing description related to the embodiments depicted in FIGS. 5-6B, and various alternatives thereof and variations thereto are merely presented for purposes of explanation. It will be apparent to one skilled in the art that some of the specific details presented herein may not be required in order to practice a particular described embodiment, or an equivalent thereof. Thus, it is understood that the foregoing and following descriptions of specific embodiments are presented for the limited purposes of illustration and description. These descriptions are not targeted to be exhaustive or to limit the disclosure to the precise forms recited above. To the contrary, it will be apparent to one of ordinary skill in the art that many modifications and variations are possible in view of the above teachings.

Figure 7:
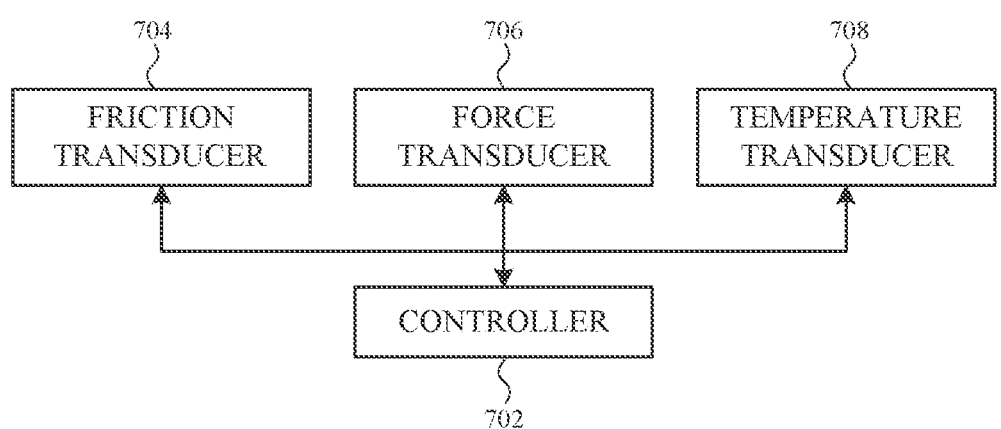
FIG. 7 depicts a simplified system diagram of a tactile user interface.

FIG. 7 depicts a system diagram of an example tactile user interface. The tactile user interface 700 includes a controller 702 such as a processor that is coupled to a friction transducer 704, a force transducer 706, and a thermal transducer 708.

The controller 702 can be implemented as any electronic device capable of processing, receiving, or transmitting data or instructions. For example, the controller 702 can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor. Accordingly, as described herein, the phrase "processing unit" or, more generally, "processor" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The controller 702, in many embodiments, can include or can be communicably coupled to circuitry and/or logic components, such as a dedicated processor and a memory. The circuitry of the controller 702 can perform, coordinate, and/or monitor one or more of the functions or operations associated with the tactile user interface including, but not limited to: increasing the temperature of an area of a surface; decreasing the temperature of an area of a surface; decreasing the temperature surrounding an area of a surface; increasing the temperature surrounding an area of a surface; detecting, approximating, and/or measuring the temperature of an area of a surface; increasing the friction exhibited by an area of a surface; decreasing the friction exhibited by an area of the surface; increasing the friction exhibited surrounding an area of a surface; decreasing the friction exhibited surrounding an area of a surface; detecting, approximating, and/or measuring the friction exhibited by an area of a surface; increasing the force output by an area of a surface; decreasing the force output by an area of a surface; detecting, approximating, and/or measuring the force exerted by a user to an area of a surface; increasing the local height of an area of a surface; decreasing the local height of an area of a surface; measuring a local height of an area of a surface; increasing a vibration emanating from a local area of a surface; decreasing a vibration emanating from a local area of a surface; generating a vibration that constructive interferes with a vibration propagating through an area of a surface; generating a vibration that destructively interferes with a vibration propagating through an area of a surface; measuring, estimating and/or determining a frequency, amplitude and/or phase of a vibration propagating through an area of a surface; and so on or any combination thereof. In some examples, the controller 702 may use time multiplexing techniques to obtain measurements from and to apply signals to each independent element of each portion of a tactile user interface.

Figure 8:
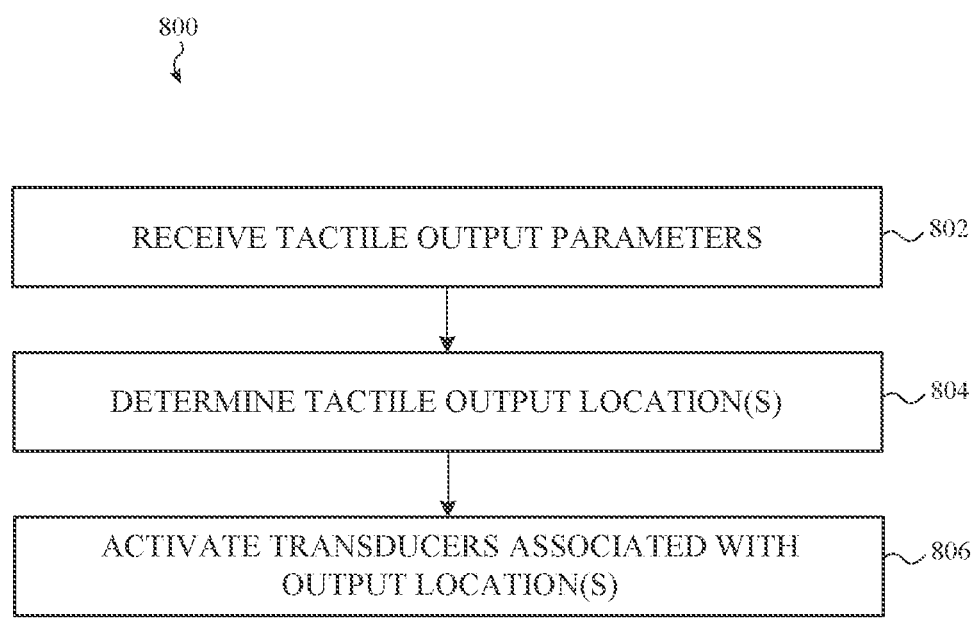
FIG. 8 is a flowchart depicting example operations of a method of providing tactile output using a tactile user interface.

FIG. 8 is a flowchart depicting example operations of a method of providing tactile output. The method depicted can, in some embodiments, be performed (at least in part) by the controller 702 depicted in FIG. 7. In other cases, the method is performed by another processor or circuit, or combination of processors or circuits.

The method 800 beings at operation 802 in which a tactile output parameter set is obtained by, for example, the controller 702 of FIG. 7. In some cases, the parameter set may be stored with or associated with a graphic, video, audio, or other file. Next, at operation 804, tactile output locations may be determined. In some cases, the coordinates of a particular portion of a tactile user interface group may be identified in the tactile output parameters, whereas in other cases, cooperation between multiple individual portion of a tactile user interface groups may be required (e.g., interpolation of a tactile output location). Next at operation 806, appropriate portion of a individually-addressable segments of the tactile user interface may be activated in order to provide the tactile output described by the tactile output parameters received at operation 802.

Figure 9:
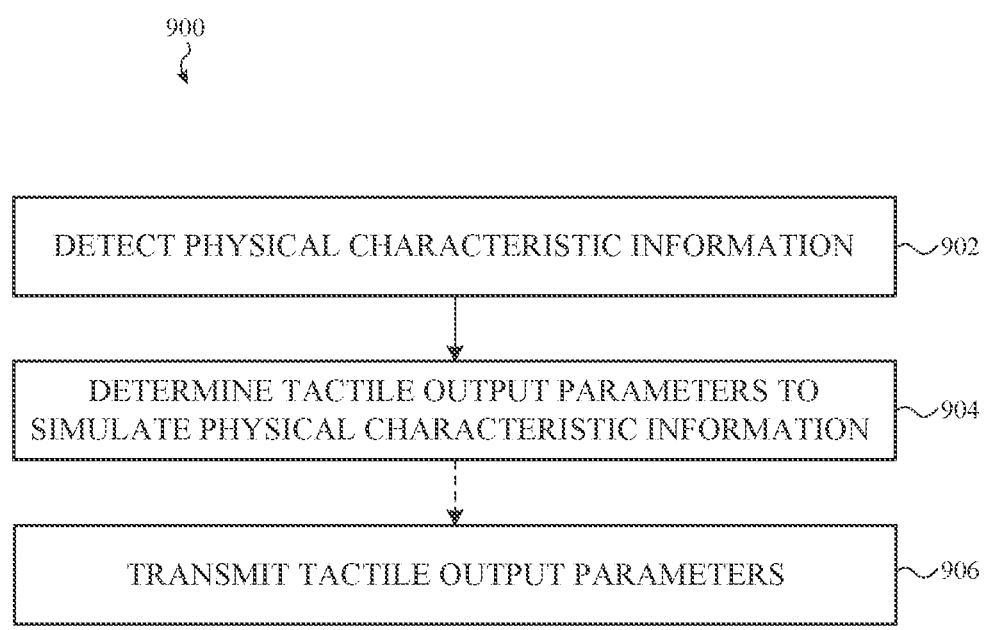
FIG. 9 is a flowchart depicting example operations of a method of determining physical characteristic information associated with an object in contact with a surface of an electronic device using a tactile user interface.

FIG. 9 is a flowchart depicting example operations of a method 900 of detecting surface characteristics of an object engaging a surface of an electronic device. The method depicted can, in some embodiments, be performed (at least in part) by the controller 702 depicted in FIG. 7. In other cases, the method is performed by another processor or circuit, or combination of processors or circuits.

The method 900 begins at operation 902 in which a surface characteristic of a surface is detected. The surface characteristic may be a temperature measurement or estimation, a force measurement or estimation, a friction measurement or estimation, or any other suitable characteristic. The method may continue to operation 904 at which the tactile output parameters required to most closely simulate the surface characteristic are determined. Lastly at operation 906, said tactile output parameters may be (optionally) transmitted to another electronic device.

More particularly, in one embodiment, a video chat application may be running between two electronic devices. A first user of the electronic device may touch the device's screen, which in turn may detect five local temperature increases and five local deformations, one associated with each of the user's five fingers. The first user's electronic device may then transmit tactile output parameters that correspond to these detected surface characteristics, which, thereafter, may be generated by portion of a individually-addressable segments of the tactile user interface on the second user's device. In this manner, the second user may be able to feel the warmth and location of the hand of the first user, despite that the first and second user may be geographically separated.

Figure 10:
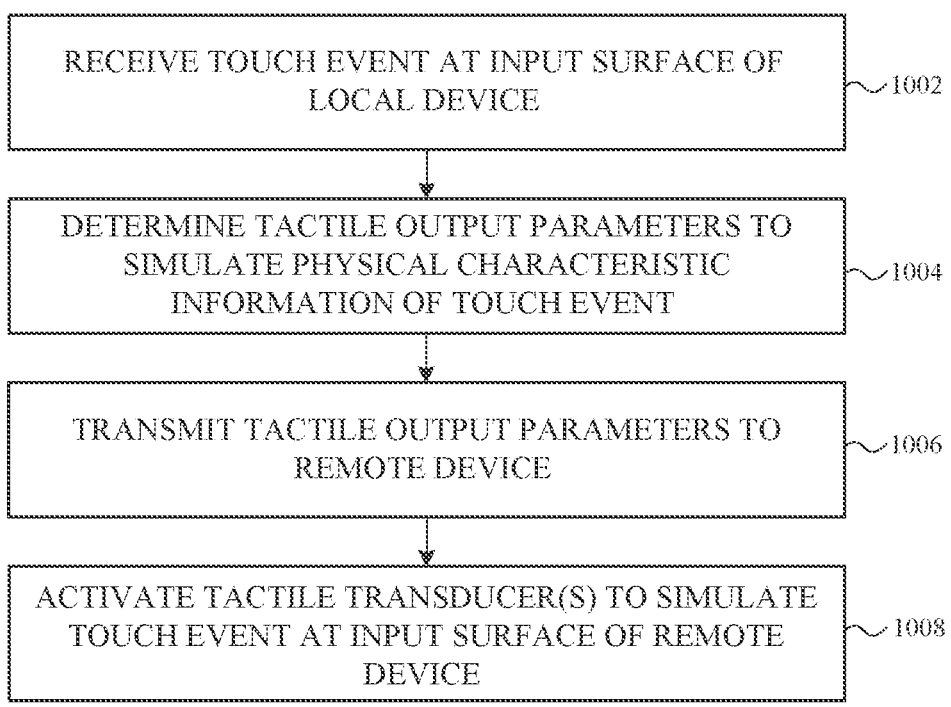
FIG. 10 is a flowchart depicting example operations of a method of transacting physical characteristic information between two or more electronic devices incorporating a tactile user interface.

FIG. 10 is a flowchart depicting example operations of a method 1000 of detecting surface characteristics of an object engaging a surface of a first device and simulating such surface characteristics via tactile output on a surface of a second device. The method depicted can, in some embodiments, be performed (at least in part) by the controller 702 depicted in FIG. 7. In other cases, the method 1000 is performed by another processor or circuit, or combination of processors or circuits.

The method 1000 begins at operation 1002 at which a touch event is received at a surface of a local electronic device. As noted with respect to other embodiments described herein, the local electronic device can be any suitable electronic device such as a desktop computer, a television, a laptop computer, a tablet computer, a cellular phone, a wearable electronic device and/or the like. The touch event can be recognized by a touch-sensitive input element.

Next, at operation 1004, tactile output parameters are determined. Such tactile output parameters correspond to the surface characteristics detected. Next at operation 1006, the determined tactile output parameters may be transmitted to a remote device. Next at operation 1008 tactile output parameters to simulate on the remote device may be determined and used to simulate a touch event at an input surface of the remote device.

The present disclosure recognizes that personal information data, including private inter-person communications, in the present technology, can be used to the benefit of users. For example, the use of tactile simulation on a surface of an electronic device can be used to provide for a more immersive computing experience.

The present disclosure further contemplates that the entities responsible for the collection, analysis, disclosure, transfer, storage, or other use of such personal information or communication data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including private inter-person communications. That is, the present disclosure contemplates that hardware and/or software elements can be provided to prevent or block access to such personal information data.

In addition, one may appreciate that although many embodiments are disclosed above, that the operations and steps presented with respect to methods and techniques described herein are meant as exemplary and accordingly are not exhaustive. One may further appreciate that alternate step order, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
   a touch sensing layer defining an upper surface configured to receive a user touch and comprising a set of capacitive electrodes configured to detect the user touch;
   a friction transducer, comprising:

an array of electrostatic plates coupled to a lower surface of an outer protective layer opposite the upper surface; and
a set of ultrasonic transducers below the array of electrostatic plates;
a set of thermal transducers in thermal communication with the upper surface, wherein the set of thermal transducers and the set of ultrasonic transducers are disposed in a shared layer, with the thermal transducers in the set of thermal transducers arranged in an alternating pattern with the ultrasonic transducers in the set of ultrasonic transducers; and
a force transducer below the array of electrostatic plates and in communication with the upper surface; wherein
at least one electrode of the set of capacitive electrodes is capacitively coupled to at least one electrostatic plate of the array of electrostatic plates to increase a voltage of the at least one electrostatic plate.

2. The electronic device of claim 1, wherein the outer protective layer is positioned above a display.

3. The electronic device of claim 1, further comprising a controller in communication with the friction transducer, the force transducer, and a thermal transducer of the set of thermal transducers.

4. The electronic device of claim 3, wherein the controller is configured to provide a high-voltage signal to the at least one electrostatic plate of the array of electrostatic plates to increase friction between a user's finger and the upper surface.

5. The electronic device of claim 3, wherein the controller is configured to provide a high frequency signal to an ultrasonic transducer of the set of ultrasonic transducers to decrease friction between a user's finger and the upper surface.

6. The electronic device of claim 1, wherein the force transducer comprises a piezoelectric element disposed below the upper surface.

7. The electronic device of claim 1, wherein the array of electrostatic plates is disposed at least partially within the outer protective layer.

8. The electronic device of claim 1, further comprising a dielectric layer disposed over the array of electrostatic plates.

9. The electronic device of claim 1, further comprising a drive circuit disposed below the outer protective layer.

10. The electronic device of claim 9, wherein the drive circuit is electrically coupled to the at least one electrostatic plate of the array of electrostatic plates by a via extending through the outer protective layer.

11. The electronic device of claim 9, wherein the drive circuit is electrically coupled to the at least one electrostatic plate of the array of electrostatic plates by a jumper extending around a periphery of the outer protective layer.

12. An electronic device comprising:
a display;
a touch sensing layer positioned above the display;
a set of capacitive electrodes configured to detect a user touch and disposed on an electrode layer below an outer protective layer;
an array of individually-addressable electrostatic plates formed on an upper surface of the outer protective layer and electrically insulated from the set of capacitive electrodes;
a set of ultrasonic transducers;
a set of thermal transducers thermally in communication with the touch sensing layer, wherein the set of thermal transducers and the set of ultrasonic transducers are disposed in a shared layer, with the thermal transducers in the set of thermal transducers arranged in an alternating pattern with the ultrasonic transducers in the set of ultrasonic transducers;
a dielectric layer disposed over the array of individually-addressable electrostatic plates; and
a drive circuit conductively coupled to the set of capacitive electrodes, positioned below the outer protective layer, and capacitively coupled to the array of individually-addressable electrostatic plates via the set of capacitive electrodes.

13. The electronic device of claim 12, wherein the drive circuit is electrically coupled to at least one individually-addressable electrostatic plate of the array of individually-addressable electrostatic plates by a via extending through a thickness of the outer protective layer.

14. The electronic device of claim 12, wherein the drive circuit is electrically coupled to at least one individually-addressable electrostatic plate of the array of individually-addressable electrostatic plates by a periphery jumper extending around a periphery of the outer protective layer.

15. The electronic device of claim 12, wherein the outer protective layer is formed with glass or sapphire.

16. The electronic device of claim 12, further comprising an array of electrical traces formed on the upper surface of the outer protective layer, each electrical trace of the array of electrical traces electrically coupled to a respective one individually-addressable electrostatic plate of the array of individually-addressable electrostatic plates.

17. The electronic device of claim 16, wherein
at least one electrical trace of the array of electrical traces is formed with a material having a first sheet resistance;
at least one individually-addressable electrostatic plate of the array of individually-addressable electrostatic plates is formed with a material having a second sheet resistance; and
the first sheet resistance is less than the second sheet resistance.

18. The electronic device of claim 12, wherein each individually-addressable electrostatic plate of the array of individually-addressable electrostatic plates is formed from an optically transparent material.

19. A portable electronic device comprising:
a touch-sensitive display comprising a set of electrodes configured to detect a touch input to the portable electronic device;
an touch sensing layer positioned above the touch-sensitive display; and
an electrostatic plate on the touch sensing layer;
a set of ultrasonic transducers;
a set of thermal transducers thermally in communication with the touch sensing layer, wherein the set of thermal transducers and the set of ultrasonic transducers are disposed in a shared layer, with the thermal transducers in the set of thermal transducers arranged in an alternating pattern with the ultrasonic transducers in the set of ultrasonic transducers;
a drive circuit coupled to the set of electrodes; wherein
in an output mode, the drive circuit is configured to apply a high-voltage signal to at least one electrode of the set of electrodes thereby capacitively coupling to the electrostatic plate to increase a voltage of the electrostatic plate.

20. The portable electronic device of claim 19, further comprising a dielectric layer encapsulating the electrostatic plate.

21. The portable electronic device of claim 19, wherein the electrostatic plate is electrically insulated from the set of electrodes.

* * * * *